(12) United States Patent
Kingsbury et al.

(10) Patent No.: US 9,434,650 B2
(45) Date of Patent: Sep. 6, 2016

(54) CERAMIC MATERIAL

(71) Applicant: Imperial Innovations Limited, London, Greater London (GB)

(72) Inventors: Benjamin Francis Knatchbull Kingsbury, Turnbridge Wells (GB); Zhentao Wu, Sutton (GB); Kang Li, Banstead (GB)

(73) Assignee: Imperial Innovations Limited, London (GB)

( * ) Notice: Subject to any disclaimer, the term of this patent is extended or adjusted under 35 U.S.C. 154(b) by 0 days.

(21) Appl. No.: 14/434,679

(22) PCT Filed: Oct. 9, 2013

(86) PCT No.: PCT/GB2013/052623
§ 371 (c)(1),
(2) Date: Apr. 9, 2015

(87) PCT Pub. No.: WO2014/057260
PCT Pub. Date: Apr. 17, 2014

(65) Prior Publication Data
US 2015/0274596 A1    Oct. 1, 2015

(30) Foreign Application Priority Data

Oct. 9, 2012   (GB) .................................. 1218079.0

(51) Int. Cl.
| | |
|---|---|
| *C04B 38/00* | (2006.01) |
| *C04B 35/10* | (2006.01) |
| *C04B 35/622* | (2006.01) |
| *B01D 39/20* | (2006.01) |
| *B01J 20/08* | (2006.01) |
| *B01J 20/28* | (2006.01) |
| *B01J 20/30* | (2006.01) |
| *B28B 11/24* | (2006.01) |

(52) U.S. Cl.
CPC ........... *C04B 35/10* (2013.01); *B01D 39/2068* (2013.01); *B01J 20/08* (2013.01); *B01J 20/28023* (2013.01); *B01J 20/28033* (2013.01); *B01J 20/3078* (2013.01); *B28B 11/243* (2013.01); *C04B 35/62231* (2013.01); *C04B 38/009* (2013.01); *C04B 2235/5436* (2013.01); *C04B 2235/5445* (2013.01); *C04B 2235/6584* (2013.01); *C04B 2235/6585* (2013.01)

(58) Field of Classification Search
CPC ....... C03C 3/062; C03C 3/064; C03C 3/066; C03C 3/068
USPC ...... 501/80, 81, 82, 83, 85; 264/171.26, 628
See application file for complete search history.

(56) References Cited

U.S. PATENT DOCUMENTS 4,175,153 A * 11/1979 Dobo .................... B01D 53/22
                                                210/510.1
5,352,481 A    10/1994 Bak et al.
(Continued)

OTHER PUBLICATIONS

Kingsbury, B.F.K., "A Morphological Study of Ceramic Hollow Fibre Membranes," 2009, J. Membrane Sci, 328:134-140, 8 pages.
(Continued)

*Primary Examiner* — Noah Wiese
(74) *Attorney, Agent, or Firm* — Senniger Powers LLP (57) ABSTRACT

The present invention relates to method for forming a porous ceramic material, the method comprising the steps of: providing a suspension of polymer-coated ceramic particles in a first solvent; contacting the suspension with a second solvent, whereby a ceramic material precursor is formed from the polymer and ceramic particles, heating the ceramic material precursor to at least partially decompose the polymer within the precursor into solid deposits, and then sintering the ceramic material precursor to form a porous ceramic material.

20 Claims, 6 Drawing Sheets

(56) References Cited

U.S. PATENT DOCUMENTS

| | | |
|---|---|---|
| 6,887,809 B1 | 5/2005 | Adler |
| 2005/0100470 A1 | 5/2005 | Lefebvre et al. |
| 2006/0175256 A1 | 8/2006 | Masten et al. |
| 2009/0305871 A1* | 12/2009 | Perera .................. D01D 4/02 502/60 |

OTHER PUBLICATIONS

International Search Report and Written Opinion, PCT Application PCT/GB2013/052623, dated May 30, 2014, 6 pages.

Great Britain Search Report, Great Britain Application No. 1218079.0, dated Feb. 7, 2013, 1 page.

* cited by examiner

I          II          III Conventional sintering I          II          III Controlled sintering

Figure 5

CERAMIC MATERIAL

REFERENCE TO RELATED APPLICATIONS

This application is a US national stage application based on PCT/GB2013/052623, filed Oct. 9, 2013, claiming priority to GB application 1218078.0, filed Oct. 9, 2012, the entire disclosures of which are incorporated by reference.

FIELD OF THE INVENTION

The present invention relates to a method for forming a porous ceramic material and to the use of that material for filtration, especially filtration of water. In particular, the invention relates to a method for controlled heating of a precursor to arrive at a particularly suitable pore formation within the ceramic material.

BACKGROUND OF THE INVENTION

Ceramic membranes are widely used in microfiltration and ultrafiltration. This is due to a number of advantages that they have over polymer counterparts. The advantages include a greater mechanical strength and structural stiffness, greater corrosive and thermal resistance, stable operating characteristics during long service, and the possibility of multiple regenerations by calcination or by the backward stream of water or an appropriate solvent. This means that ceramic membranes can be operated over a wide pH range, at high temperatures and pressures, and in corrosive media. On the other hand, these membranes can be brittle and also expensive due to the energy-intensive technology of their fabrication.

Ceramic membranes are of interest for filtration systems, such as for the filtration of water where the high strength material allows for the use of high pressure filtration. Examples of such filters are discussed in US2006/0175256.

The separation performance of filtration membranes is normally evaluated by two factors, the selectivity and the permeability. In a porous ceramic filter, selectivity is determined by membrane pore size formed by the voids between packed particles or grains after the membrane is formed. Permeability is a function of pore size, pore size distribution and porosity. In order to achieve desired pore size and high permeability, a multilayer membrane structure may be employed, in which one or more layers of finer particles are progressively coated or deposited onto another substrate layer made of bigger particles, forming a gradient pore structure.

As discussed in "A morphological study of hollow fiber membranes", Kingsbury et al., Journal of Membrane Science 328 (2009) 134-140, it is possible to prepare ceramic hollow fiber membranes by a method of phase inversion. Such membranes have a good porous structure and are ideal for use at high temperatures and pressures, and in corrosive environments. However, it has been found that these methods do not necessarily provide sufficiently high permeability for use in all desired applications.

SUMMARY OF THE INVENTION

Accordingly, it is desirable to provide an improved porous ceramic material and/or tackle at least some of the problems associated with the prior art or, at least, to provide a commercially useful alternative thereto. It is an object of the present invention to provide a ceramic material suitable for use as a filter having an increased permeability compared to other such filters.

In a first aspect the present disclosure provides a method for forming a porous ceramic material, the method comprising the steps of:

providing a suspension of polymer-coated ceramic particles in a first solvent;

contacting the suspension with a second solvent, whereby a ceramic material precursor is formed from the polymer and ceramic particles, heating the ceramic material precursor to at least partially decompose the polymer within the precursor into solid deposits, and then sintering the ceramic material precursor, preferably under an inert atmosphere, to form a porous ceramic material.

DETAILED DESCRIPTION OF PREFERRED EMBODIMENTS

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

By "ceramic material" it is meant any inorganic crystalline or amorphous material compound of a metal and a non-metal. Ceramic materials include, for example, $Al_2O_3$, $SiO_2$, $ZrO$, $CeO_2$ and $TiO_2$. It is preferred that the ceramic material comprises a metal oxide.

By a "porous" ceramic material it is meant that the ceramic material has a structure comprising a plurality of pores. These pores may, of course, be filed with a non-ceramic material. Preferably the pores are not filled and form connected porosity within the material to act as flow paths for material being filtered. Examples of such porous materials are well known in the art and the flow paths or channels are ideal for the filtration of a media to be filtered.

By "oxygen-containing atmosphere" it is meant an atmosphere that contains at least some $O_2$ gas, including, for example, air or a pure oxygen stream. The level of oxygen present in the atmosphere can be controlled and monitored, either by using a fixed volume of air or a selected flow-rate.

In the first step of the method described herein there is provided a suspension of polymer-coated ceramic particles in a first solvent. Preferably the ceramic particles comprise one or more metal oxides, preferably selected from $Al_2O_3$, $ZrO$, $SiO_2$, $CeO_2$, $TiO_2$ and mixtures of two or more thereof. Aluminium oxide is especially preferred. The selection of the ceramic particles may be determined by the desired final application of the material. For example, $TiO_2$ has antibacterial properties, whereas $Al_2O_3$, and $SiO_2$ are comparatively cheap and durable, making them suitable for bulk applications.

Preferably the ceramic particles have a longest average diameter of from 5 to 0.01 microns, preferably from 2 to 0.01 microns, and most preferably from 2 to 0.1 microns. More preferably the ceramic particles have a range of sizes within this range. The specific particle size is not especially limiting but can be selected based upon the desired application. By particle it is meant to include a powder or fine granular material.

Preferably the polymer comprises one or more invertible polymers. Such polymers are known in the art. The most preferred polymers for use in the method disclosed herein are cellulose acetate and/or polyethersulfone. In order to select a suitable polymer it is essential that the polymer is soluble in the first solvent and insoluble in the second solvent. The polymer may be a mixture of polymers.

Preferably the first solvent comprises one or more of N-methyl-2-pyrrolidone, dimethyl sulphoxide, tetrahydrofuran and Dimethyl acetamide. These solvents are selected due to their ability to form a suspension of the polymer-coated particles and their miscibility with water which allows for the phase inversion technique to form the precursor. The first solvent may be a mixture of solvents.

The suspension is then contacted with a second solvent, whereby a ceramic material precursor is formed from the polymer and ceramic particles. Preferably the second solvent comprises water. Water is especially preferred since it is cheap, readily available and non-toxic. The second solvent is selected so that it is miscible with the first solvent and the polymer is insoluble in it. The second solvent may be a mixture of solvents.

The ceramic material precursor is then heated to at least partially decompose the polymer within the precursor into solid deposits. Preferably the solid deposits comprise carbon deposits and most preferably the deposits consist of carbon deposits. The decomposition of the polymer serves reduce the volume of polymer within the precursor, but also provides thermally resilient solid deposits within the structure. There are various techniques by which this effect can be achieved and these are discussed below.

The ceramic material precursor is then sintered, preferably under an inert atmosphere, to form a porous ceramic material. Preferably the ceramic material precursor is sintered at a temperature of from 1000 to 1800° C., more preferably from 1200 to 1600° C., and most preferably at a temperature of about 1300-1450° C. The use of an inert atmosphere is desirable because it prevents the loss of the polymer/polymer-derived solid deposits during the sintering which prevent the formation of an overly densified product. Under an inert atmosphere higher temperatures can be employed because the solid deposits remain and mitigate against over densification, while the high temperatures result in a stronger final product.

Preferably the inert atmosphere comprises nitrogen. Any inert gas, such as argon or other noble gases can be used. However, nitrogen is particularly cost effective and is preferred.

In one embodiment the sintering step may be conducted under an oxygen-containing atmosphere (preferably air, for cost and simplicity) and preferably at a lower than conventional temperature, such as from 1000 to 1300° C., more preferably from 1200 to 1250° C. The method of this embodiment may be carried out in accordance with every aspect of the method disclosed generally herein (including each of the various techniques for heating the ceramic material precursor) while still achieving a desirably strong and durable material that has an improved permeability. Nevertheless, it has been found that the sintering in air does not provide the same high levels of permeability demonstrated when sintering is conducted under an inert atmosphere. In conventional heat treatments the precursor needs to be sintered at a temperature of at least 1450° C. in order to achieve sufficient strength for applications, such as filtration, especially water filtration. The inventors have discovered that it is possible to achieve this strength without such a high temperature treatment and this prevents the over-densification of the material, resulting in a good permeability.

In one embodiment there is disclosed a method of forming a porous ceramic membrane for use in a water filter, wherein the sintering is carried out under air and at a temperature of from 1000 to 1300° C.

The ceramic material may then be heated under an oxygen-containing atmosphere to remove the solid deposits and any remaining polymer. Heating the precursor in air, for example, at 600° C. or greater will cause any carbon deposits to be oxidised to a gas and to leave the structure. This provides a material suitable for use as a filter.

As will be appreciated, the ceramic material may be produced in any desired shaped. However, for the purposes of filtration in particular, it is preferred that the porous ceramic material is in the form of a hollow fiber. Preferably the porous ceramic material is a porous ceramic membrane. Preferably the material is in the form of a membrane.

In one embodiment the material forms part of a multilayer membrane and, in this case, preferably the material forms the initial structure on which the subsequent layers are formed. It has been found that the current technique provides single layer membranes that have he same performance as conventionally prepared multilayer membranes.

The ceramic material used herein may be provided in the form of hollow tubes or fibers. By providing such fibers with an inlet end and a sealed distal end, a medium may be flowed into the fiber and through the porous structure of the material. In this way a filtration is conducted on the medium flowed through the fibers. The medium may desirably be a liquid or a gas. The retentate will generally be particulate matter and the permeate will be a purer liquid or gas. The fibers manufactured according to the present disclosure are typically provided as a cylinder open at each end. Accordingly, desirably one end of the fiber is closed, preferably with a sealant, such as an epoxy resin, to close off the through-flow of the medium to be filtered.

The present inventors have discovered that it is possible to prepare a highly porous ceramic material suitable for use as a hollow fiber membrane or as a module for micro- and ultra-filtrations, by controlled sintering of ceramic precursors fabricated by combined phase inversion and sintering based techniques. The precursor hollow fiber membranes can be of single-layer, dual-layer or triple-layer structures that are formed in a single-step fabrication, namely co-extrusion process followed by the controlled co-sintering. The fabrication of ceramic hollow fiber membranes is known, but the inventors have discovered that with a controlled sintering step a highly porous ceramic membrane can be achieved.

In a conventional sintering process the final pore structure of a ceramic membrane is formed from the voids among the packed particles or grains in the precursor. With the increased sintering temperatures, the ceramic particles begin to fuse together to form the final material.

Without wishing to be bound by theory, it is considered that this fusing or gradual joining together occurs due to a number of mechanisms such as surface diffusion, lattice diffusion from the surface, vapour transport, grain boundary diffusion, lattice diffusion from the grain boundaries and plastic flow. These mechanisms result in bigger ceramic particles or ceramic grain size, and reduced porosity of the ceramic membranes. It also leads to the shrinking of ceramic membrane, increase of membrane density and decrease of membrane porosity. When the temperature is higher than a certain value, the whole membrane can be densified with little porosity left. This is also the major reason that a highly permeable ceramic membrane with small pore size is very difficult to obtain by conventional sintering. The porosity of a membrane may be determined using conventional techniques such as mercury intrusion porosimetry. However, as a comparative measure it is often simplest to compare performance details such as selectivity and permeability which can be compared by any known technique.

Advantageously, the inventors have found that the method disclosed herein (heating and then sintering under, for example, $N_2$) promotes membrane porosity and hence permeability without losing the selectivity or mechanical strength. In the method the ceramic particles in the precursor are covered by a thin layer of polymer-binder that precipitated during the phase inversion process. This precipitated polymer-binder also occupies the voids among these particles. During the first heating step the polymer binder is at least partially decomposed to create interfaces between the particles. Then, when the sintering occurs the grains cannot fully merge into a densified body due to the presence of the remaining polymer or solid decomposition products. Instead, a structure is formed with voids filled with or defined by the polymer or the decomposition products of the polymer.

That is, the polymer binder or solid deposits left in the voids among the ceramic particles functions as a sintering inhibitor preventing the substantial growth of ceramic particles and maintaining the well defined continuous pore structure. Another benefit is that the pore size and pore size distribution of the membrane can be designed by using ceramic particles of different sizes, since the smaller particles are normally inserted into the voids formed by the packing of bigger particles, forming even smaller pore size or narrower pore size distribution of the resultant membranes. These smaller particles will not disappear during the controlled sintering process when they are "protected" by the polymer binder or solid deposits left inside the membrane. This is something that conventional sintering can not achieve.

An additional advantage of "protecting" ceramic particles from over-growing during high temperature sintering is that higher sintering temperatures can be used in order for improved mechanical strength of the resultant membrane without losing the membrane porosity. That is, stronger bonding between ceramic particles can be achieved without further significant growth of ceramic particles or grains. After high temperature sintering, the polymer or solid deposits left inside the membrane can be easily removed by calcination at lower temperatures in air, which results in a highly porous ceramic membrane without compromising the final structure. Furthermore, by using this technique the pore size of the final product can be designed and selected by the initial packing of ceramic particles.

The same process can also be used for precursor fibers of dual-layer or triple-layer structures, in which one or more layers of finer particles are progressively formed, but in a single-step fabrication process. The polymer binder or carbon left during the controlled sintering that functions as the sintering inhibitor contributes to reduce the difference of sintering behaviours between the substrate layer made of larger particles and the separation layers made of finer particles.

The inventors have discovered several approaches to achieving the method that retains solid deposits and, optionally, some of the polymer in the pores of the ceramic material.

According to a first technique, the step of heating the ceramic material precursor comprises a first step of heating the ceramic material precursor under an inert atmosphere to decompose the polymer into the solid deposits preferably comprising carbon deposits. That is, the ceramic material is heated to a sufficient temperature to decompose the polymer, for example, to a temperature of from 700-1000° C. and preferably from 750-850° C. This causes the polymer to decompose into solid deposits of reduced volume within the precursor. Due to the porous nature of the precursor, any gaseous by-products leave the structure. Since the atmosphere is inert, any carbon contained in the polymer is retained in the structure and does not leave as a gaseous component from the precursor. In an optional second step the precursor is then heated under an oxygen-containing atmosphere to partially remove the carbon deposits from the ceramic material precursor. In order to ensure that the carbon loss is only partial and not complete, the second heating step may be carried out with limited oxygen, for a limited duration of heating, or for a limited time under the oxygen-containing atmosphere.

According to a second technique, the step of heating the ceramic material precursor comprises heating the ceramic material precursor under an oxygen-containing atmosphere to partially decompose the polymer into the solid deposits and then under an inert atmosphere to fully decompose the solid deposits into carbon deposits, and then, optionally, heating under an oxygen containing atmosphere to partially remove the carbon deposits from the ceramic material precursor. Again, the oxygen-containing atmosphere can be controlled to ensure that the polymer is not fully removed from the precursor, as in conventional approaches.

According to a third technique, the step of heating the ceramic material precursor comprises heating the ceramic material precursor in a sealed oxygen-containing atmosphere whereby the solid deposits are partially removed from the ceramic material precursor. That is, the amount of oxygen is controlled so that a known amount of the polymer decomposes, is oxidised and leaves the precursor. For example, for carbon deposits, the carbon produced by the decomposition reacts with the available oxygen to form carbon dioxide and/or carbon monoxide gas which is not retained by the porous structure. The limited oxygen content means that it can be ensured that some of the carbon solid deposits remain.

Preferably the sintering is conducted once there is no oxygen remaining in the sealed atmosphere. That is, the heating is conducted in the sealed box until there is no oxygen remaining and, accordingly, no further steps need to be taken to provide the inert atmosphere required for the sintering step.

According to a fourth technique, the step of heating the ceramic material precursor comprises heating the ceramic material precursor in air at a temperature sufficient to cause at least partial decomposition of the polymer, such as preferably from 450 to 550° C. That is, the temperature is controlled so that the polymer is only partially decomposed within the time for which it is at an elevated temperature. If the polymer is fully decomposed then it is essential that the temperature is not so high that solid deposits do not remain. In conventional methods the ceramic material precursor may be heated in air to 600 C, at which temperature the polymer decomposition will be complete. In this embodiment, the heating is preferably performed by ramping the temperature at a rate of from 1 degree/minute to 25 degrees/minute (preferably from 2 to 10 and most preferably about 5 degrees/minute) to the desired temperature and then ramping the temperature down again at the same rate, preferably without significant dwelling at the temperature.

According to a second aspect, there is provided a porous ceramic material obtainable by the process described herein. As will be appreciated, due to the presence of the solid deposits and, optionally undecomposed polymer, in the precursor before sintering, the structure of the final product is very different from those created by any other method. The material has a higher porosity and a more uniform pore structure and therefore a higher flux than can be achieved by conventional techniques. The difference achieved in the surface structure is demonstrated in the figures. Preferably there is provided a porous ceramic membrane having a permeation flux of at least 2000 L/m²h.

According to a third aspect there is provided a filter comprising the porous ceramic material described herein.

According to a fourth aspect there is provided the use of the porous ceramic material or the filter described herein for filtration, preferably filtration of water. Due to the stability and strength of the ceramic filter, the filter is suitable for any form of particulate filtration. Moreover, the pore size can be tuned and selected based upon the desired material to be filtered. Other liquids can also be filtered, including alcohols and other organic solvents.

The porous ceramic material disclosed herein may also be suitable for use as a support for catalysis, for example, and it is useful for applications which rely on high surface area, high porosity ceramic materials. This includes catalytic exhaust systems. Accordingly, in one embodiment, the method is for making a porous ceramic material for use as a catalytic support. In such uses the catalyst may be incorporated into the structure when it is formed or applied into the pores as a subsequent coating. In one embodiment, the method is for making a porous ceramic material for use in an catalytic convertor, such as for an automobile. Other uses include sound damping and as absorbents.

Figure 1:
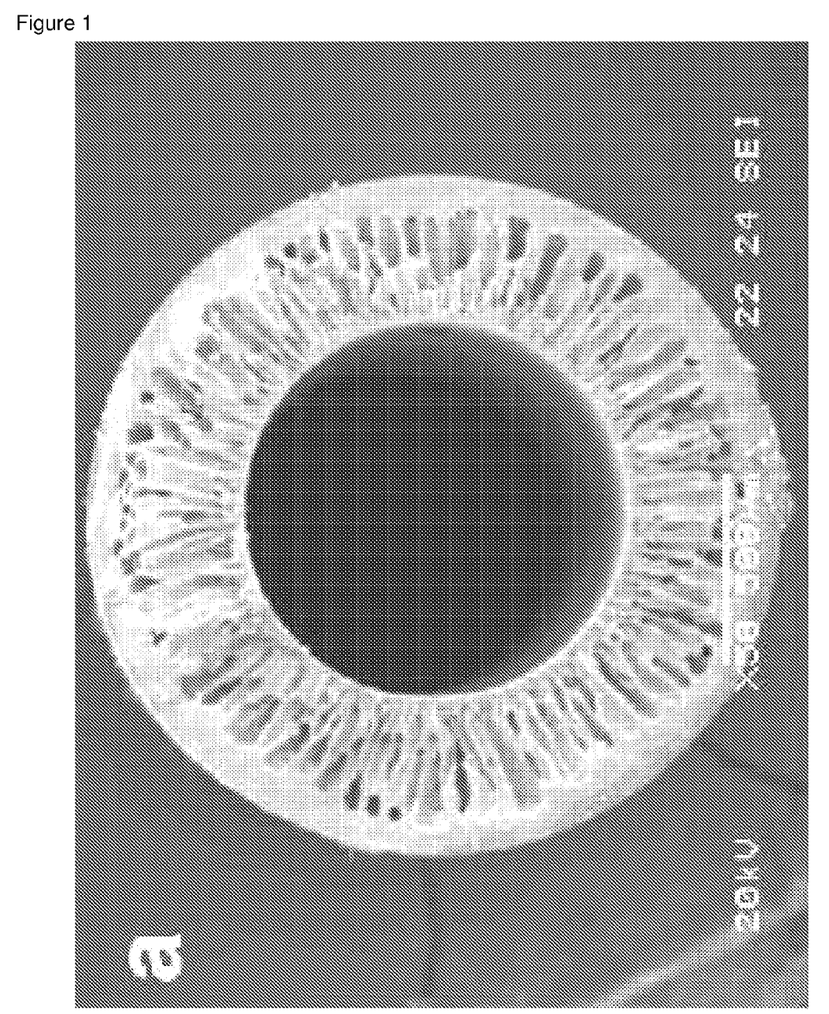
FIG. 1 shows a cross-sectional image across a fiber produced as described herein.

The invention will now be described in relation to the following non-limiting figures, in which:

FIG. 1 shows a cross-sectional image across a fiber produced as described herein. The porous structure can clearly be seen across the width of the tube walls.

Figure 2:
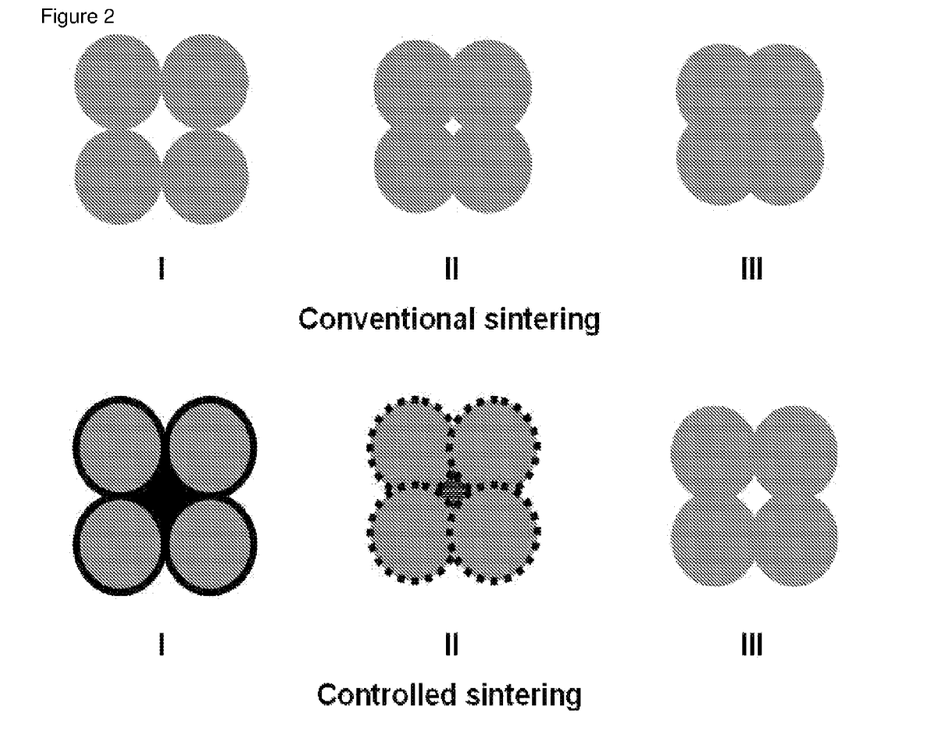
FIG. 2 shows a representational diagram of what is considered to be the underlying theory behind the method described herein.

FIG. 2 shows a representational diagram of what is considered to be the underlying theory behind the method described herein.

Figure 3:
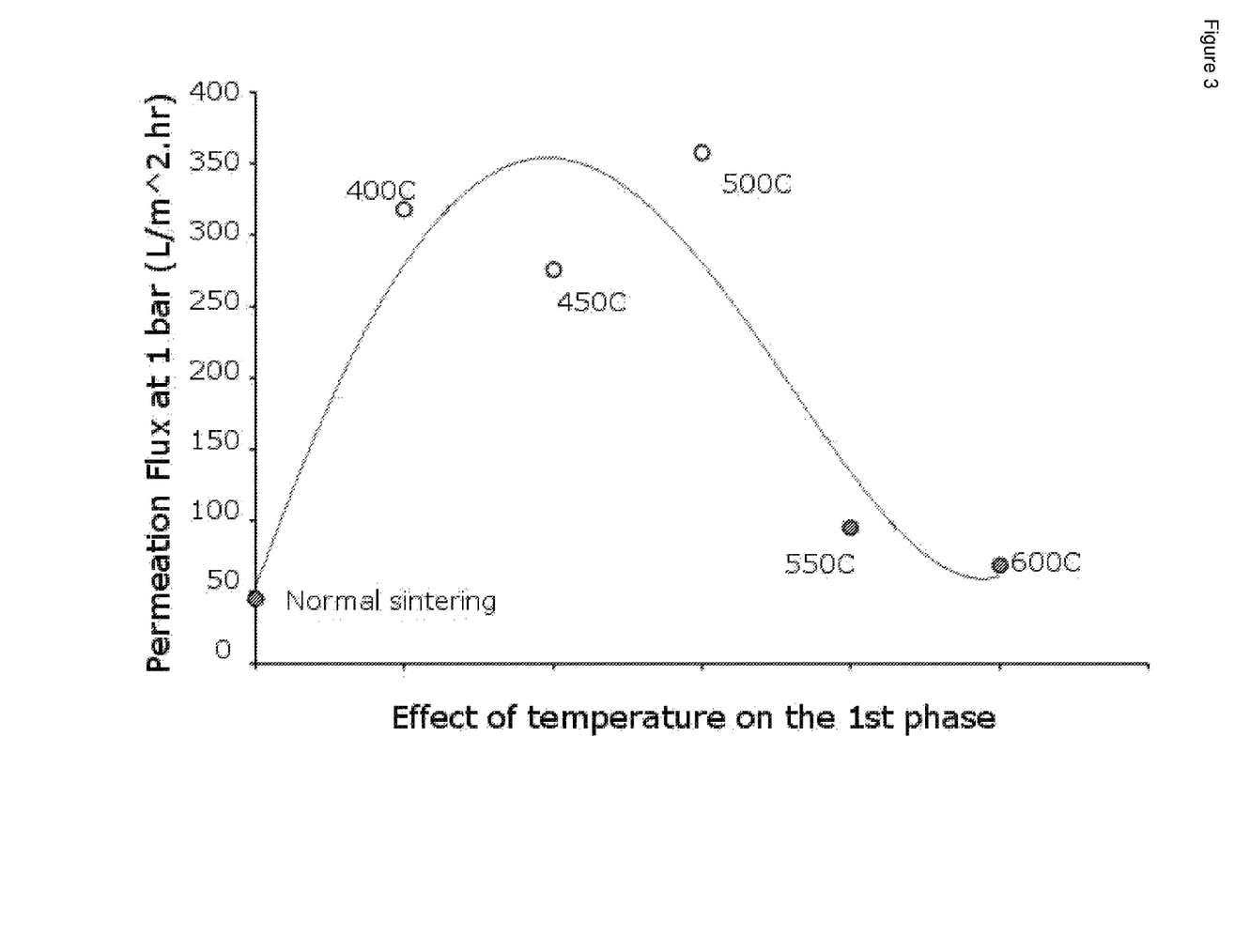
FIG. 3 shows a plot of the permeation for different heating temperatures under air.

FIG. 3 shows a plot of the permeation for different heating temperatures under air. This reflects the partial removal of the polymer binder at different temperatures in the initial heating step which increases the flux through the precursor.

Figure 4:
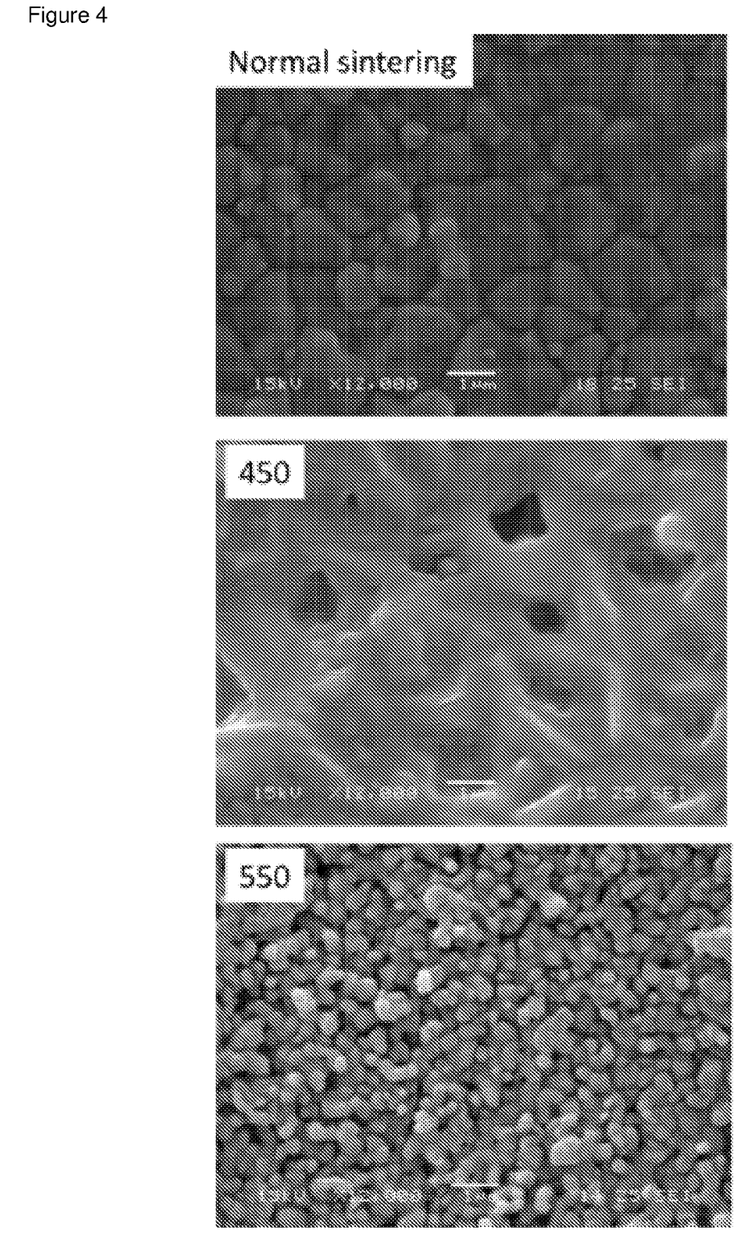
FIG. 4 shows SEM images of the surface of the material precursor before sintering and after the initial heat treatment in air at the indicated temperatures.

FIG. 4 shows SEM images of the surface of the material precursor before sintering and after the initial heat treatment in air at the indicated temperatures. As can be seen, there is a more porous, less merged structure at those temperatures below conventional sintering. Note the presence of remaining polymer at 400 and 450° C. The temperature is shown in Celsius in the top left of each figure.

Figure 5:
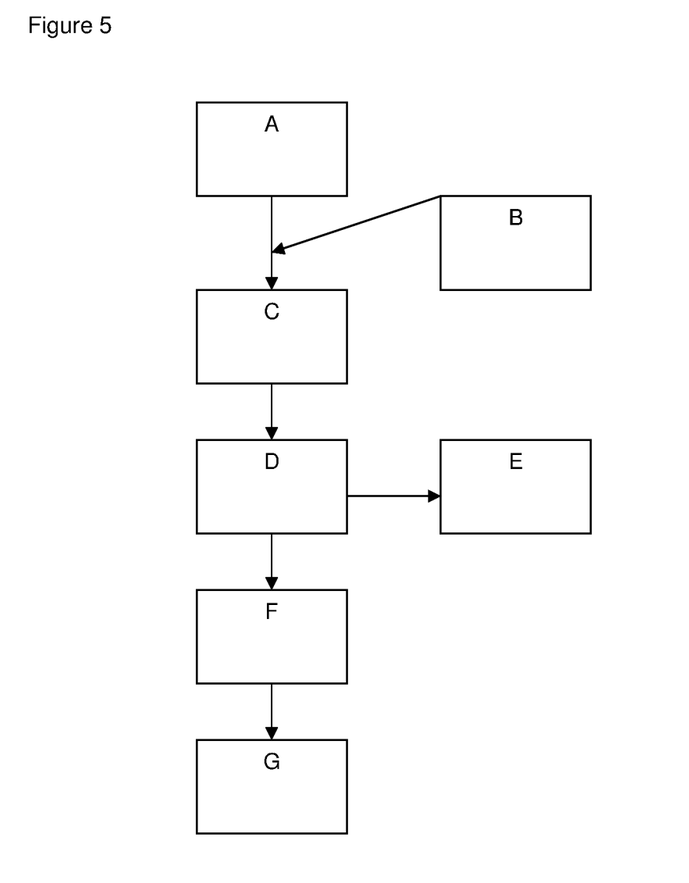
FIG. 5 shows a flow-chart of the key steps in the method.

FIG. 5 shows a flow-chart of the key steps in the method.

As shown in FIG. 5, a suspension is provided of polymer-coated ceramic particles in a first solvent A. The suspension A is contacted with a second solvent B and this causes the formation of a ceramic material precursor C by phase inversion.

The precursor C is then heated to at least partially decompose the polymer and to form a heat-treated precursor D. Some gaseous species E may be lost from the precursor during this heat treatment.

The heat-treated precursor D is then sintered under an inert atmosphere to provide the porous ceramic material F. Following an optional subsequent lower-temperature heat treatment in the presence of oxygen, any remaining carbon in the material is removed to clear the pores.

The invention will now be described in relation to the following non-limiting examples.

EXAMPLE

A porous ceramic material was prepared using aluminium oxide powder with a mean particle diameter of <1 μm (alpha, 99.9% metal basis, surface area 6-8 m²/g).

Polyethyleneglycol 30-dipolyhydroxystearate at a concentration of 1.3 wt % was dissolved in N-methyl-2-pyrrolidone (NMP)/water solutions prior to the addition of aluminium oxide powders (58.7 wt %). The dispersion was rolled/milled with 20 mm agate milling balls with an approximate $Al_2O_3$/agate weight ratio of 2 for 48 h. Milling was continued for a further 48 h after the addition of Polyethersulfone (PESf) (6.1 wt %). The suspension was then transferred to a gas tight reservoir and degassed under vacuum until no bubbles could be seen at the surface. After degassing, the suspension was transferred to a 200 ml Harvard stainless steel syringe and was extruded through a tube-in-orifice spinneret (ID 1.2 mm, OD 3.0 mm) into a coagulation bath containing 120 litres of water (a non-solvent for the polymer) with an air-gap of between 1-15 cm. DI water was used as the internal coagulant and the flow rate ranged from 3 to 21 ml/min. The extrusion rate of the spinning suspension and the flow rate of the internal coagulant were accurately controlled and monitored by two individual Harvard PHD 22/2000 Hpsi syringe pumps, ensuring the uniformity of the prepared precursor fibres.

The fiber precursors were left in the external coagulation bath overnight to allow for completion of phase inversion. They were then immersed in an excess of tap water which was replaced periodically over a period of 48 h in order to remove traces of NMP.

COMPARATIVE EXAMPLE

A fiber precursor was heated under static air with the following heating profile.

| From | to | Details | O2 % |
|---|---|---|---|
| RT | 600 | 2 C./min | Static air |
| 600 | 600 | 120 min | |
| 600 | 1450 | 5 C./min | |
| 1450 | 1450 | 240 min | |
| 1450 | RT | 3 C./min | |

Example 1

Decomposition of the Polymer and then Partial Removal

A fiber precursor was placed under an inert atmosphere of nitrogen and heated from room temperature to 800° C. This caused the polyethersulfone to decompose into carbon deposits evenly distributed throughout the precursor structure. With the precursor still at 800° C. a controlled amount of oxygen was added to the atmosphere and used to partly remove the carbon from the structure. When the oxygen concentration had then dropped to zero, the precursor was sintered at 1450° C. for four hours under $N_2$. If the sintering was under air then the carbon would have all been oxidised away and the structure would have to a greater extent resulting in a lower porosity. Finally the porous ceramic material was cooled and then heated to 600° C. and air was introduced into the chamber. The material was held for 2 hours in this static air to ensure that all of the carbon was oxidised out of the pores of the structure (calcination).

A summary of these reaction conditions is shown below:

| $N_2$ flow rate | 181.4 ml/min |
| --- | --- |
| $O_2$ flow rate | 18.5 ml/min |
| $O_2$ % | 9.23 % |

| Heating Profile | | | |
| --- | --- | --- | --- |
| From | to | Details | O2 % |
| RT | 800 | 5 C./min | 0 |
| 800 | 800 | 2, 5, 10 min of $O_2$ + 120 min $N_2$ | |
| 800 | 1450 | 5 C./min | 0 |
| 1450 | 1450 | 240 min | 0 |
| 1450 | RT | 3 C./min | 0 |
| RT | 600 | 5 C./min | 9.23 |
| 600 | 600 | 120 min | 9.23 |
| 600 | RT | 5 C./min | 9.23 |

The water permeation of the fibers was also examined at each of the various oxygen durations and compared to a conventional preparation technique (600° C. under air). At one bar of water pressure the conventional membrane passed $0.2 \times 10^3$ $Lm^{-2}$ $h^{-1}$. At one bar of water pressure the membrane prepared with 2 minutes of oxygen passed $1.2 \times 10^3$ $Lm^{-2}$ $h^{-1}$. At one bar of water pressure the membrane prepared with 5 and 10 minutes of oxygen passed approximately $2.1 \times 10^3$ $Lm^{-2}$ $h^{-1}$.

Example 2

Heating Under Static Air

A fiber precursor was placed under in a static air atmosphere and heated to a temperature of from 400 to 600° C. and then cooled from the same temperature to room temperature (5°/min ramps). In the range of from 450-550° C. this caused the polyethersulfone to decompose and be partially oxidised out of the precursor structure. At 600 C, under conventional conditions, the polyethersulfone was fully removed from the precursor. The precursor was then sintered at 1450° C. for four hours under $N_2$. If the sintering was under air then the carbon would have all been oxidised away and the structure would have become fully densified at that temperature. Finally the porous ceramic material was cooled and then heated to 800° C. under air. The material was held for 2 hours in this static air to ensure that all of the carbon was oxidised out of the pores of the structure.

A summary of these reaction conditions is shown below:

| $N_2$ flow rate | 181.4 ml/min |
| --- | --- |

| Heating Profile | | | |
| --- | --- | --- | --- |
| From | to | Details | O2 % |
| RT | 400-600 | 5 C./min | Static air |
| 400-600 | RT | 5 C./min | Static air |
| RT | 1450 | 5 C./min | 0 |
| 1450 | 1450 | 240 min | 0 |
| 1450 | RT | 3 C./min | 0 |
| RT | 800 | 5 C./min | Static air |
| 800 | 800 | 120 min | Static air |
| 800 | RT | 5 C./min | Static air |

The flux through the fibers was also examined at each of the various oxygen durations and compared to a conventional preparation technique (600° C. under air). At one bar of pressure the conventional membrane passed 50 $Lm^{-2}$ $h^{-1}$. At one bar of pressure the membrane prepared at 500 C passed 325 $Lm^{-2}$ $h^{-1}$. At one bar of pressure the membrane prepared at 450 C passed approximately 250 $Lm^{-2}$ $h^{-1}$.

Example 3

Decomposition of the Polymer and then Partial Removal

A fiber precursor was placed under an inert atmosphere of nitrogen and heated from room temperature to 1200° C. This caused the polyethersulfone to decompose into carbon deposits evenly distributed throughout the precursor structure. The precursor was then cooled to room temperature, still under nitrogen. The precursor was then heated under static air at 500-600° C. to partly remove the carbon from the structure. The precursor was sintered at 1450° C. for four hours under $N_2$. If the sintering was under air then the carbon would have all been oxidised away and the structure would have become fully densified at that temperature. Finally the porous ceramic material was cooled and then heated to 800° C. under air. The material was held for 2 hours in this static air to ensure that all of the carbon was oxidised out of the pores of the structure.

| $N_2$ flow rate | 181.4 ml/min |
| --- | --- |

| Heating Profile | | | |
| --- | --- | --- | --- |
| From | to | Details | O2 % |
| RT | 1200 | 5 C./min | 0 |
| 1200 | 1200 | 120 min | 0 |
| 1200 | RT | 5 C./min | 0 |
| RT | 500-600 | 5 C./min | Static air |
| 500-600 | RT | 5 C./min | Static air |
| RT | 1450 | 5 C./min | 0 |
| 1450 | 1450 | 240 min | 0 |
| 1450 | RT | 3 C./min | 0 |
| RT | 800 | 5 C./min | Static air |
| 800 | 800 | 120 min | Static air |
| 800 | RT | 5 C./min | Static air |

The flux through the fibers was also examined at each of the various oxygen durations and compared to a conventional preparation technique (600° C. under air). At one bar of pressure the conventional membrane passed 8 $Lm^{-2}$ $h^{-1}$.

At one bar of pressure the membrane prepared at 500 C passed 26 Lm$^{-2}$ h$^{-1}$. At one bar of pressure the membrane prepared at 550 C passed approximately 32 Lm$^{-2}$ h$^{-1}$.

Example 4

Aluminium oxide (Al$_2$O$_3$) powder of 1 μm (alpha, 99.9% metals basis, surface area 6-8 m$^2$/g) was purchased from Alfa-Aesar and was used as supplied. Polyethersulfone (PESf) (Radal A300, Ameco Performance, USA), Dimethyl sulfoxide (DMSO) (HPLC grade, Rathbone), and Arlacel P135 (polyethylene glycol 30-dipolyhydroxystearate, Uniqema) were used as a polymer binder, solvent and additive, respectively. Tap water and de-ionized water were used as the external and internal coagulants, respectively.

Arlacel P135 was first dissolved in the solvent (DMSO), where the 1 μm Al$_2$O$_3$ powder (63 wt. %) was then added. The mixture was ball milled for no less than 48 hours before the adding of PESf (6.3 wt. %), followed by another milling of 48 hours. The uniform suspension formed was then fully degassed under vacuum before being used for fibre fabrication. A tube-in-orifice spinneret (OD 3 mm, ID 1.2 mm) was used, with an air-gap of 15 cm. The extrusion rate of the suspension and the flow rate of internal coagulate were 7 and 12 ml/min, respectively.

The precursor fibres were calcined in a CARBOLITE furnace using both normal sintering and controlled sintering processes, with the detailed sintering parameters listed in Table 1 below.

TABLE 1

| Temperature (° C.) | | Rate | Dwelling time | | Sintering |
|---|---|---|---|---|---|
| From | To | (° C./min) | (min) | Atmosphere | type |
| RT | 600 | 2 | — | Static air | Normal sintering |
| 600 | 600 | — | 120 | | |
| 600 | 1450 | 5 | — | | |
| 1450 | 1450 | — | 240 | | |
| 1450 | RT | 3 | — | | |
| RT | 400-600 | 5 | — | Static air (1$^{st}$ step) | Controlled sintering |
| 400-600 | RT | 5 | — | | |
| RT | 1450 | 5 | — | N$_2$ (2$^{nd}$ step) | |
| 1450 | 1450 | — | 240 | | |
| 1450 | RT | 3 | — | | |
| RT | 800 | 5 | — | Static air (3$^{rd}$ step) | |
| 800 | 800 | — | 120 | | |
| 800 | RT | 3 | — | | |

Static air was used throughout the whole normal sintering, while for controlled sintering, static air was used for the first and third step and N$_2$ was used in the second step.

For the first thermal treatment in air, gas tight end seals are taken off, allowing naturally diffusion of air into the furnace tube where precursor fibres are located. While in the second step where an oxygen free atmosphere is needed, a continuous stream of N$_2$ is directed through the furnace tube, with the outlet connected to an oxygen analyser to monitor the actual sintering atmosphere. The gas tight end seals are removed at the end of step 2, allowing air to fill the furnace tube again, prior to the 3rd step of controlled sintering. In this study, the only variable parameter in the controlled sintering is the first thermal treatment temperature (400-600° C.).

Thermogravimetric analysis (TGA Q500, TA Instruments) was used to analyse the weight change of PESf in air and N$_2$, and weight change of carbon in air. Membrane morphology and microstructure were characterized by scanning electron microscopy (SEM, JEOL JSM-5610 LV). Mercury intrusion porosimetry (Micromeritics Autopore IV) was used to investigate the asymmetric pore structure of the membranes. The effects of controlled sintering on membrane performance were evaluated by a water permeation test, and compared with the counterparts sintered in static air.

Diametrical compression test was used to evaluate the mechanical property of ceramic hollow fiber segments (approximately 20 mm), using Instron Model 5544 tensile tester with a load cell of 5 kN. Micro-tubular samples were placed horizontally on a planar base, with another planar crosshead moving down at a speed of 0.5 mm/min until fracture occurred. All samples were assumed to be a concentric ring structure, with the fracture strength ($\sigma_F$, MPa) obtained using following equation:

$$\sigma_F = \frac{2 P_F r (6r - t)}{\pi l t^2 (2r - t)} \quad (1)$$

Where $P_F$(N) denotes the fracture load, r (m) is the mean radius ((OD+ID)/4), t (m) denotes the wall thickness and l (m) is the length of sample.

The most unique difference between normal sintering and controlled sintering developed in this study has been briefly presented in Table 1. Basically, instead of fully burning off the uniform PESf polymeric phase in normal sintering, it is thermally treated first in static air (1st step) to partially remove the polymer, followed by pyrolysis of the remaining polymer into carbon at a higher temperature (2nd step). During this process, the sintering of ceramic particles proceeds, but with the presence of carbon in voids of particles, which suppresses the growth of ceramic grains. The carbon is then removed in static air (3rd step), resulting in a more porous ceramic membrane. It should be noted that, the 1st step of controlled sintering is designed to remove excess amount of PESf required in fabricating precursor fibres, otherwise, the excessive amount of carbon would halt the sintering of ceramic particles, even at the temperature of 1450° C.

The role of PESf phase in the controlled sintering process was investigated by TGA analysis. PESf can be fully burnt off below 800° C. (in air), which is the same as most polymeric materials. The increasing weight loss with the elevated temperatures indicates a reduction in polymeric phase. While in N$_2$, a stable weight loss of approximately 60% is obtained from around 800° C., which agrees with the value by directly firing PESf in N$_2$ at 1450° C. for 4 hours. This means that, when such carbon is formed, it can be quite stable in an oxygen free atmosphere. The presence of such a uniform carbon phase would help to stabilize a more porous membrane structure at possibly higher sintering temperatures, which is still quite challenging to normal sintering even if some pore formers are used. The carbon formed can subsequently be removed in air, resulting in a highly porous ceramic membrane. It can also be seen that, observable weight change of PESf in air starts from approximately 400° C., and as a result the thermal treatment temperature between 400 and 600° C. was used for the 1st step of controlled sintering.

For the purpose of comparison, precursor fibres of the same structure were sintered using the normal sintering process (Table 1). Besides a typical asymmetric structure consisting of a sponge-like layer supported onto a finger-like layer, the inner surface is more porous than the outer surface.

As for the controlled sintering, after the thermal treatment (1st step of controlled sintering), there is a significant change in the colour of precursor fibres. With the increasing temperatures, the samples turn from light yellow to dark brown, together with less and less inorganic phase left. Such changes agree with the variation in micro-structures of precursor fibres seen. The inner surface of initial precursor fibre is significantly different from the one treated at 400° C. and 500° C., the two selected samples, although it is less obvious to the outer surface due to the less amount of polymer. However, after controlled sintering (2nd and 3rd steps), the outer surface of controlled sintered samples is more porous with less sintered alumina grains when compared with normal sintering, proving the role of PESf discussed above in forming a more porous ceramic membrane by suppressing grain growth.

It should also be noted that, although adding pore formers is another way of increasing porosity of ceramic membranes, by creating "micro-caves" inside the membrane, it cannot efficiently affect membrane pore size if the normal sintering procedure is applied.

Since the pore structure of such asymmetric hollow fibre membranes is quite unique from conventional ceramic membranes, mercury intrusion was used to investigate the effects of controlled sintering on membrane pore structures. Normally sintered samples show a typical asymmetric pore structure, i.e. bigger pores on the inner surface and smaller pores in the outer sponge-like separation layer. For the controlled sintering with the thermal treatment temperatures between 400° C. and 500° C., pore size of the inner surface tends to reduce slightly, while the one in the sponge-like separation layer is nearly doubled. Although the reason for minor change in inner surface pore size is yet clear, which may be linked to the more concentrated PESf in precursor fibres, the significant increase in separation layer pore size is in agreement with SEM images. As has been discussed above, the 1st step thermal treatment contributes to lower the organic phase in precursor fibres, and the residual organic phase inside the outer sponge-like layer is uniformly distributed around alumina particles, as well as in the packed voids among these particles. During the high temperature sintering in $N_2$ (2nd step), the residual organic phase turns into carbon and thus helps to reduce the grain growth that densifies ceramic membranes with increasing sintering temperatures. After removing carbon (3rd step), a more porous membrane can thus be obtained.

However, if the thermal treatment temperature is too high (550-600° C.), an insufficient amount of organic phase remained, thus lack of carbon exists to prevent the membrane densification, and as such, pore size of the outer sponge-like separation layer is comparable with normal sintering. Moreover, the trend of reducing inner surface pore size continues with the increasing thermal treatment temperatures.

Water permeation of ceramic membranes can be affected by several parameters, such as membrane pore size, porosity and thickness etc. For the purpose of comparison, water permeation of hollow fibre membranes (sintered in both a normal and controlled way) with the separation layer of around 50 μm was tested. It was found that water permeation of controlled sintered membranes is always higher than that of the normally sintered one, from a couple of times to approximately 13 times (at 1.38 bar). Furthermore, water permeation of the membranes thermally treated between 400 and 500° C. is substantially higher those treated at 550 and 600° C., this trend agrees well with the change of separation layer pore size. For the asymmetric alumina hollow fibre membranes used in this study, the separation layer is considered as the outer sponge-like layer, and variation in its thickness (normal and controlled sintering) is no more than approximately 20%. As a result, it is reasonable to consider that the variation in water permeation is primarily from the change in pore size and porosity of the outer separation layer.

For membranes thermally treated between 400 and 500° C., densification of membrane is efficiently suppressed due to the presence of carbon. As a result, bigger pore sizes, probably as well as a higher porosity, can be maintained at the high sintering temperature (1450° C.), which substantially improves water permeation. Water permeation of the membrane treated at 500° C. exceeds those of 400 and 450° C., which is unexpected but possible, as water permeation is co-affected by both pore size and porosity. For those membranes thermally treated between 550 and 600° C., although the pore size seems to be quite close to the normally sintered sample, the presence of carbon contributes to increase membrane porosity, leading to a higher water permeation flux than the normally sintered counterpart.

For normally sintered ceramic membranes, the grain growth at high sintering temperatures usually leads to lower membrane porosity (densification) and consequently less water permeation. Meanwhile, proper mechanical strength can be obtained due to the formation of grain boundaries. As has been introduced above, PESf is a continuous phase in both spinning suspension and precursor membranes. This means that it "occupies" not only the voids formed by the packed ceramic particles, but also any gaps between these ceramic particles. PESf in packed voids acts as a pore structure "stabilizer" in controlled sintering after being converted into carbon. While the one between ceramic particles, which should be less in quantity needs to be carefully controlled as it prevents the bounding between ceramic particles.

An evaluation of mechanical property of normally sintered (NS) and controlled sintered membranes was performed. Both fracture load and strength of controlled sintered membranes increase with the increasing pre-treatment temperatures. Samples thermally treated at 400 and 450° C. are considerably weaker than the others, which indicates an excessive amount of polymeric phase between ceramic particles, agreeing with the results discussed earlier which show that only a small weight loss of PESf occurs in this temperature range. At 500° C., fracture load of controlled sintered membrane is comparable with normally sintered counterparts, while its strength is slightly lower due to the slightly different membrane dimensions. Although its grain boundary may be weaker than the normally sintered sample, because of a small amount of polymeric phase existing between particles, more boundaries due to the smaller grain size still contribute to a proper mechanical strength. It should be noted here that, an increased sintering temperature (1450° C. in this study) may potentially help to further improve its mechanical strength without sacrificing membrane porosity and water permeation. The pre-treatment temperatures of 550 and 600° C. lead to membranes even stronger than normally sintered one, in which smaller grain size with more grain boundaries may play an important role, the improvement in water permeation is dramatically reduced, indicating a over removal of PESf.

Significantly improved water permeation can thus be achieved by reducing membrane densification at high temperatures, without losing membrane strength.

In this example, a controlled sintering process has been developed for a more permeable alumina hollow fibre membrane, by using PESf as a source of pore structure "stabilizer" to prevent over densification of alumina membranes. Thermal treatment in static air contributes to adjust the concentration of organic phase in precursor fibres, and subsequently the amount of carbon during high temperature sintering in $N_2$. This leads to different pore structure of the separation layer, as well as higher water permeation. For example, pore size of the separation layer is increased from approximately 0.18 (normal sintering) to 0.35 µm (controlled sintering), due to the efficient suppress on grain growth at high sintering temperatures. Besides proper mechanical property, water permeation can be increased by approximately 13 times when compared with normal sintering. Furthermore, other polymers besides PESf can be used for the same purpose, and the concept of using such polymeric phase to maintain proper pore structure of ceramic membranes has been found to apply equally to other ceramic materials besides alumina.

Compared to the membranes with the same asymmetric structure and sintered in static air only (i.e. normal sintering), the membranes sintered using the controlled sintering processes described herein shows water permeation flux up to approximately 13 times higher, together with comparable mechanical strength.

Although preferred embodiments of the invention have been described herein in detail, it will be understood by those skilled in the art that variations may be made thereto without departing from the scope of the invention or of the appended claims.

The invention claimed is:

1. A method for forming a porous ceramic material, the method comprising the steps of:
    providing a suspension of polymer-coated ceramic particles in a first solvent;
    contacting the suspension with a second solvent, whereby a ceramic material precursor is formed from the polymer and ceramic particles,
    heating the ceramic material precursor in the presence of oxygen to at least partially decompose the polymer within the precursor into solid deposits,
    then sintering the ceramic material precursor under an inert atmosphere to form a porous ceramic material; and
    then heating the porous ceramic material under an oxygen-containing atmosphere to remove the solid deposits.

2. The method according to claim 1, wherein the inert atmosphere comprises nitrogen.

3. The method according to claim 1, wherein the ceramic particles comprise one or more metal oxides selected from $Al_2O_3$, $ZrO$, $SiO_2$, $CeO_2$, $TiO_2$ and mixtures of two or more thereof.

4. The method according to claim 1, wherein the ceramic particles have a longest average diameter of from 5 to 0.01 microns.

5. The method according to claim 1, wherein the polymer comprises one or more invertible polymers.

6. The method according to claim 1, wherein the solid deposits comprise carbon deposits.

7. The method according to claim 1, wherein the first solvent comprises one or more of N-methyl-2-pyrrolidone, dimethyl sulphoxide, tetrahydrofuran and Dimethyl acetamide.

8. The method according to claim 1, wherein the second solvent comprises water.

9. The method according to claim 1, wherein the ceramic material precursor is sintered at a temperature of from 1200 to 1600° C.

10. The method according to claim 1, wherein the porous ceramic material is in the form of a hollow fiber.

11. The method according to claim 1, wherein the step of heating the ceramic material precursor comprises heating the ceramic material precursor in air at a temperature sufficient to cause at least partial decomposition of the polymer.

12. The method according to claim 1, wherein the porous ceramic material is a porous ceramic membrane.

13. The method of claim 1, wherein:
    the ceramic material precursor is sintered under an inert atmosphere at a temperature of from 1000 to 1300° C. to form the porous ceramic material; and
    the porous ceramic material is heated under an oxygen-containing atmosphere of greater than 600° C. to remove the solid deposits.

14. The method according to claim 1, wherein heating of the ceramic material precursor in the presence of oxygen to at least partially decompose the polymer within the precursor into solid deposits occurs as a multi-step operation.

15. The method according to claim 1, wherein the ceramic material precursor is heated in the presence of oxygen at a temperature of from 450 to 550° C. to at least partially decompose the polymer within the precursor into solid deposits.

16. The method according to claim 1, wherein during heating of the ceramic material precursor in the presence of oxygen to at least partially decompose the polymer within the precursor into solid deposits the temperature is ramped at a rate of from 1 degree/minute to 25 degrees/minute to a desired temperature, followed by ramping the temperature down from the desired temperature at a rate of from 1 degree/minute to 25 degrees/minute.

17. A method for forming a porous ceramic material, the method comprising the steps of:
    providing a suspension of polymer-coated ceramic particles in a first solvent;
    contacting the suspension with a second solvent, whereby a ceramic material precursor is formed from the polymer and ceramic particles,
    heating the ceramic material precursor to at least partially decompose the polymer within the precursor into solid deposits by heating the ceramic material precursor under an inert atmosphere to decompose the polymer into the solid deposits comprising carbon deposits and then heating under an oxygen-containing atmosphere to partially remove the carbon deposits from the ceramic material precursor; and
    then sintering the ceramic material precursor to form a porous ceramic material.

18. The method of claim 17, wherein the ceramic material precursor is heated under the inert atmosphere at a temperature of from 1000 to 1300° C., and then heated under the oxygen-containing atmosphere at a temperature greater than 600° C.

19. A method for forming a porous ceramic material, the method comprising the steps of:
    providing a suspension of polymer-coated ceramic particles in a first solvent;
    contacting the suspension with a second solvent, whereby a ceramic material precursor is formed from the polymer and ceramic particles,
    heating the ceramic material precursor to at least partially decompose the polymer within the precursor into solid deposits by heating the ceramic material precursor under an oxygen-containing atmosphere to partially decompose the polymer into the solid deposits and then under an inert atmosphere to fully decompose the solid deposits into carbon deposits, and then heating under an oxygen containing atmosphere to partially remove the carbon deposits from the ceramic material precursor; and then sintering the ceramic material precursor to form a porous ceramic material.

20. A method for forming a porous ceramic material, the method comprising the steps of:

providing a suspension of polymer-coated ceramic particles in a first solvent;

contacting the suspension with a second solvent, whereby a ceramic material precursor is formed from the polymer and ceramic particles, heating the ceramic material precursor in a sealed oxygen-containing atmosphere to at least partially decompose the polymer within the precursor into solid deposits and to partially remove the solid deposits from the ceramic material precursor; and then sintering the ceramic material precursor to form a porous ceramic material once there is no oxygen remaining in the sealed atmosphere.

* * * * *